(12) United States Patent
Kruger et al.

(10) Patent No.: US 6,480,143 B1
(45) Date of Patent: Nov. 12, 2002

(54) ELECTRONIC IDENTIFICATION SYSTEM

(75) Inventors: Johan Dawid Kruger, Witkoppen (ZA); Christopher Gordon Gervase Turner, Halfway House (ZA)

(73) Assignee: Supersensor (Proprietary) Limited, Goodwood (ZA)

( * ) Notice: Subject to any disclaimer, the term of this patent is extended or adjusted under 35 U.S.C. 154(b) by 0 days.

(21) Appl. No.: 09/435,467

(22) Filed: Nov. 8, 1999

(30) Foreign Application Priority Data

Nov. 9, 1998 (ZA) ............................................ 98/10199

(51) Int. Cl.$^7$ ........................... G01S 13/74; G01S 13/75
(52) U.S. Cl. ............................. 342/44; 342/42; 342/51
(58) Field of Search ...................... 342/30–32, 42–51; 370/445

(56) References Cited

U.S. PATENT DOCUMENTS

| | | | |
|---|---|---|---|
| 4,691,202 A | | 9/1987 | Denne et al. |
| 5,189,246 A | | 2/1993 | Marsh et al. |
| 5,282,421 A | | 2/1994 | Marsh et al. |
| 5,353,009 A | | 10/1994 | Marsh et al. |
| 5,406,890 A | | 4/1995 | Marsh et al. |
| 5,450,087 A | * | 9/1995 | Hurta et al. .................. 342/42 |
| 5,519,381 A | | 5/1996 | Marsh et al. |
| 5,530,702 A | * | 6/1996 | Palmer et al. .............. 370/445 |
| 5,537,105 A | | 7/1996 | Marsh et al. |
| 5,557,280 A | | 9/1996 | Marsh et al. |
| 5,566,441 A | | 10/1996 | Marsh et al. |
| 5,686,920 A | * | 11/1997 | Hurta et al. .................. 342/42 |
| 5,699,066 A | | 12/1997 | Marsh et al. |
| 5,726,630 A | | 3/1998 | Marsh et al. |
| 6,154,136 A | | 11/2000 | Van Eeden |

FOREIGN PATENT DOCUMENTS

| EP | 0 694 860 A2 | 1/1996 |
|---|---|---|
| EP | 0 467 036 B2 | 2/1996 |

* cited by examiner

*Primary Examiner*—Bernarr E. Gregory
(74) *Attorney, Agent, or Firm*—Finnegan, Henderson, Farabow, Garrett & Dunner, L.L.P.

(57) ABSTRACT

An electronic identification system 100 comprises an interrogator 10 and a plurality of transponders 12, 14 and 16. The interrogator comprises a transmitter 11 for transmitting an interrogation signal to the transponders; a receiver 13 for receiving response signals from the transponders; and a controller 19 for processing response signals received, to identify the transponders by their respective response signals. Each transponder comprises a signature generator 35, 32 for generating a unique signature characteristic of the transponder and intermittently transmits, in responses to the interrogation signal, a response signal including the signature. The interrogator further comprises an acknowledgement signal generator 21 for generating upon reception of a response signal from one of the transponders, an acknowledgement signal to be transmitted by the transmitter 11. The acknowledgement signal comprises the signature, thereby to acknowledge reception of the response signal.

17 Claims, 3 Drawing Sheets

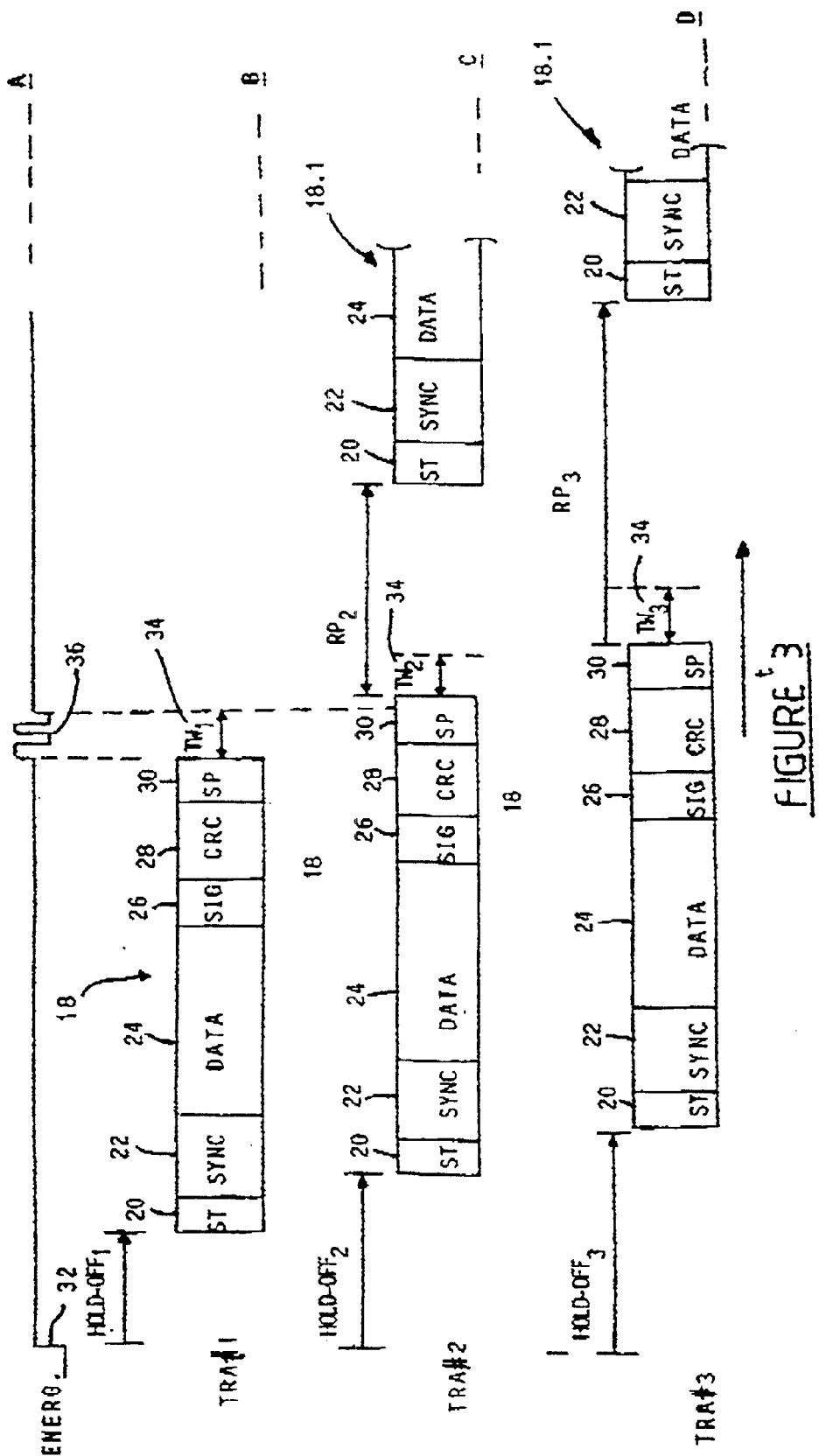

ELECTRONIC IDENTIFICATION SYSTEM

INTRODUCTION AND BACKGROUND

Figure 1:
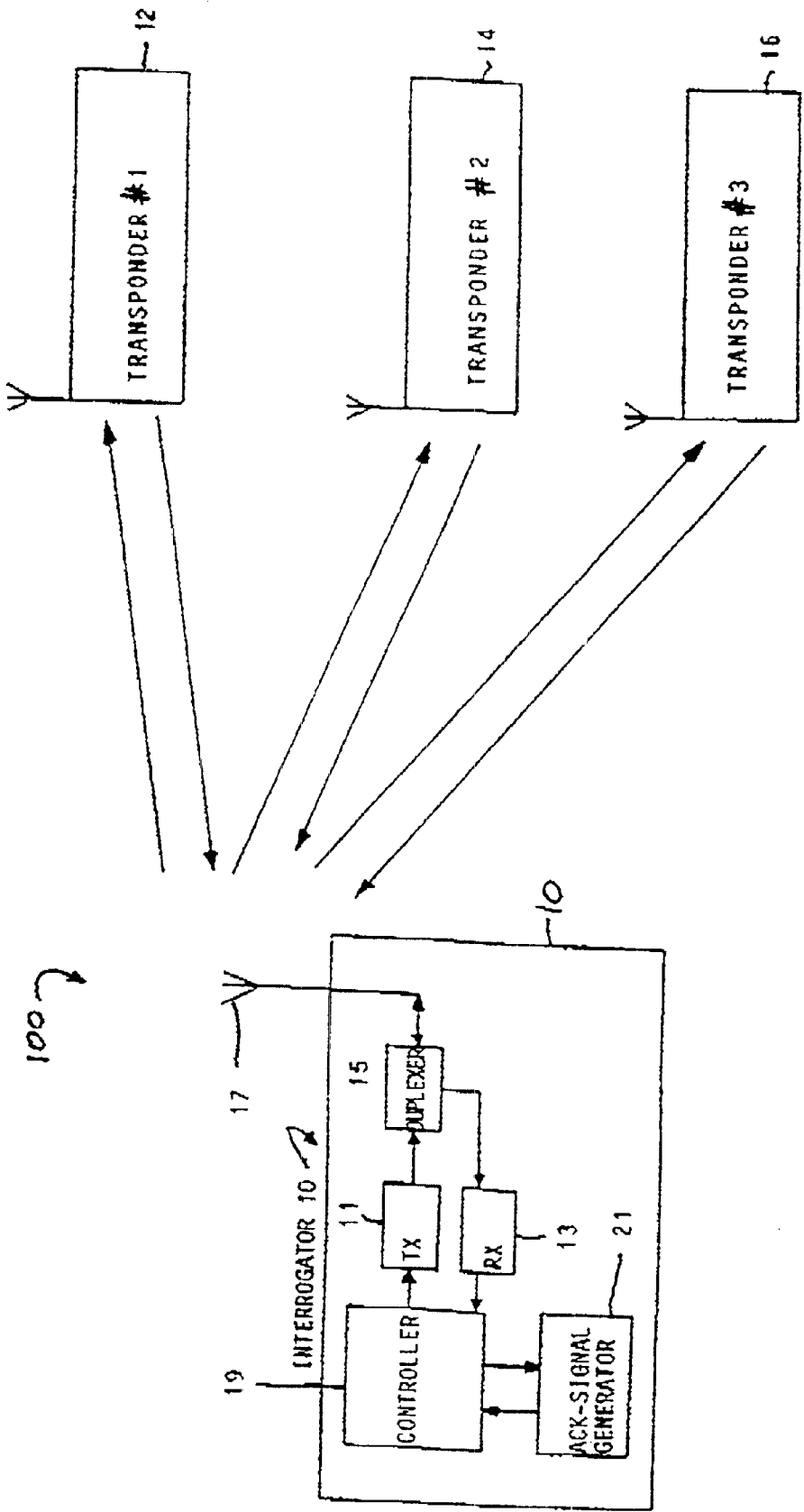

This invention relates to electronic identification systems and more particularly to such a system comprising an interrogator and a plurality of transponders.

In an electronic identification system of the aforementioned kind known to the applicant, the interrogator comprises a transmitter for transmitting an interrogation signal to a plurality of transponders and a receiver for receiving intermittently repeated discrete response signals from the transponders. A microprocessor in. the interrogator reads and identifies a particular transponder from characteristic data in a data stream in the response signal received from that transponder. In a time window immediately after transmission of the response signal, the transponder awaits an acknowledgement from the interrogator indicative of the fact that the transponder has been read by the interrogator. The acknowledgement is non-discriminative or non-specific and is provided by the interrogator by a brief interruption of the energizing signal, If the interruption is detected by a transponder during the aforementioned time window associated with that transponder, that transponder accepts that it has been read and it then changes to a sleep mode wherein it does not reply to the interrogator, to enable the interrogator to read other transponders not yet read. The probability of collisions in response signals from the plurality of transponders is reduced by utilizing for each transponder a respective randomly generated hold off time after energization by the interrogator has commenced and before the first response signal is transmitted by the transponder; and by causing the response signal to be repeated after randomly generated time periods.

In spite of these measures designed to avoid collisions and to facilitate accurate reading and subsequent switching of transponders already read, errors still occur. For example, because the acknowledgement signal is non-specific, any and all transponders the time window of which is active at the time when the acknowledgement signal is transmitted will be switched off, whether they have been read or not.

OBJECT OF THE INVENTION

Accordingly it is an object of the present invention to provide an alternative system and method with which the applicant believes the aforementioned disadvantages may at least be alleviated.

SUMMARY OF THE INVENTION

According to the invention there is provided an electronic identification system comprising an interrogator and a plurality of transponders
the interrogator comprising:
 transmitter means for transmitting an interrogation signal to the transponders;
 each transponder comprising:
  signature generating means for generating a unique signature characteristic of the transponder;
  transmitter means for intermittently transmitting in response to the interrogation signal a response signal sing the signature;
 the interrogator further comprising acknowledgement signal generating means for generating upon reception of a response signal from one of the transponders, an acknowledgement signal comprising the unique signature of the transponder to be transmitted by transmitter means of the interrogator, thereby to acknowledge reception of the response signal to said one transponder.

The transmitter means of the transponder may comprise modulator means for backscatter modulating the interrogation signal with the response signal. In other embodiments the transmitter means may include a local carrier generator for generating and transmitting the response signal.

Further according to the invention each transponder may comprise time window generating means to generate a time window immediately after transmission of each of the intermittent response signals; and a controller for causing the transponder to change from a normal operational mode to another mode, if an acknowledgement signal comprising the respective signature is received during said time window.

The signature generating means may comprise a random number generator and the signature may be in the form of a randomly generated number. The generator may be adapted to generate a new signature each time the interrogation signal is received again, after it has been interrupted.

The random number generator may also be operative to determine a random delay or hold off period after first reception of the interrogation signal and before a first of said intermittent response signals is transmitted.

Furthermore, the random number generator may also be operative to determine random repetition periods for the intermittent response signals.

The random number generator may also be operative to generate a divisor for a programmable clock frequency divider of the transponder, from time to time to yield a randomly selected clock frequency for the controller of the transponder.

The aforementioned acknowledgement signal may also include a command to cause the transponder to switch from the normal operational modes to a selected one of a plurality of other modes.

Also included within the scope f the present invention is an interrogator for use with an electronic identification system also comprising a plurality of transponders; the interrogator comprising:
 transmitter means for transmitting an interrogation signal to the plurality of transponders;
 receiver means for receiving response signals originating from the plurality of transponders; each response signal comprising a signature characteristic of a respective transponder from which it originates; and
 a controller for processing at least one of the response signals received and for causing an acknowledgement signal comprising the signature to be transmitted.

Still further included within the scope of the present invention is a transponder comprising:
 receiver means for receiving an interrogation signal;
 signature generating means for generating a signature characteristic of the transponder;
 transmitter means for transmitting in response to the interrogation signal a response signal comprising the signature characteristic of the transponder; and
 a controller adapted to cause the transponder to switch from one mode of operation to another, if an acknowledgement signal comprising the signature is received.

The signature generating means may comprise a random number generator and the signature may thus be in the form of a number.

The transponder may also comprise time window generating means to generate a time window immediately after transmission of the response signal within which time window the acknowledgement signal is expected.

The number generator may be operative to determine a delay or hold off period after first reception of the interrogation signal and before the response signal is transmitted.

The random number generator may be operative to determine random repetition periods for the response signal.

The random number generator may be operative to generate a divisor for a programmable clock frequency divider of the transponder, from time to time to yield a randomly selected clock frequency for the controller of the transponder.

According to another aspect of the invention there is provided a method of operating an electronic identification system comprising an interrogator and a plurality of transponders the method comprising the steps of:

transmitting from the interrogator an interrogation signal to the transponders:

causing the transponders to receive the interrogation signal and each intermittently to respond with a response signal comprising a signature characteristic of the transponder;

causing the interrogator to receive the response signals and to process a response signal from at least one of the transponders;

causing the interrogator to transmit an acknowledgement signal comprising the signature of the at least one of the transponders; and causing the at least one of the transponders upon reception of the acknowledgement signal to switch from one mode of operation to another mode of operation.

BRIEF DESCRIPTION OF THE ACCOMPANYING DIAGRAMS

Figure 2:
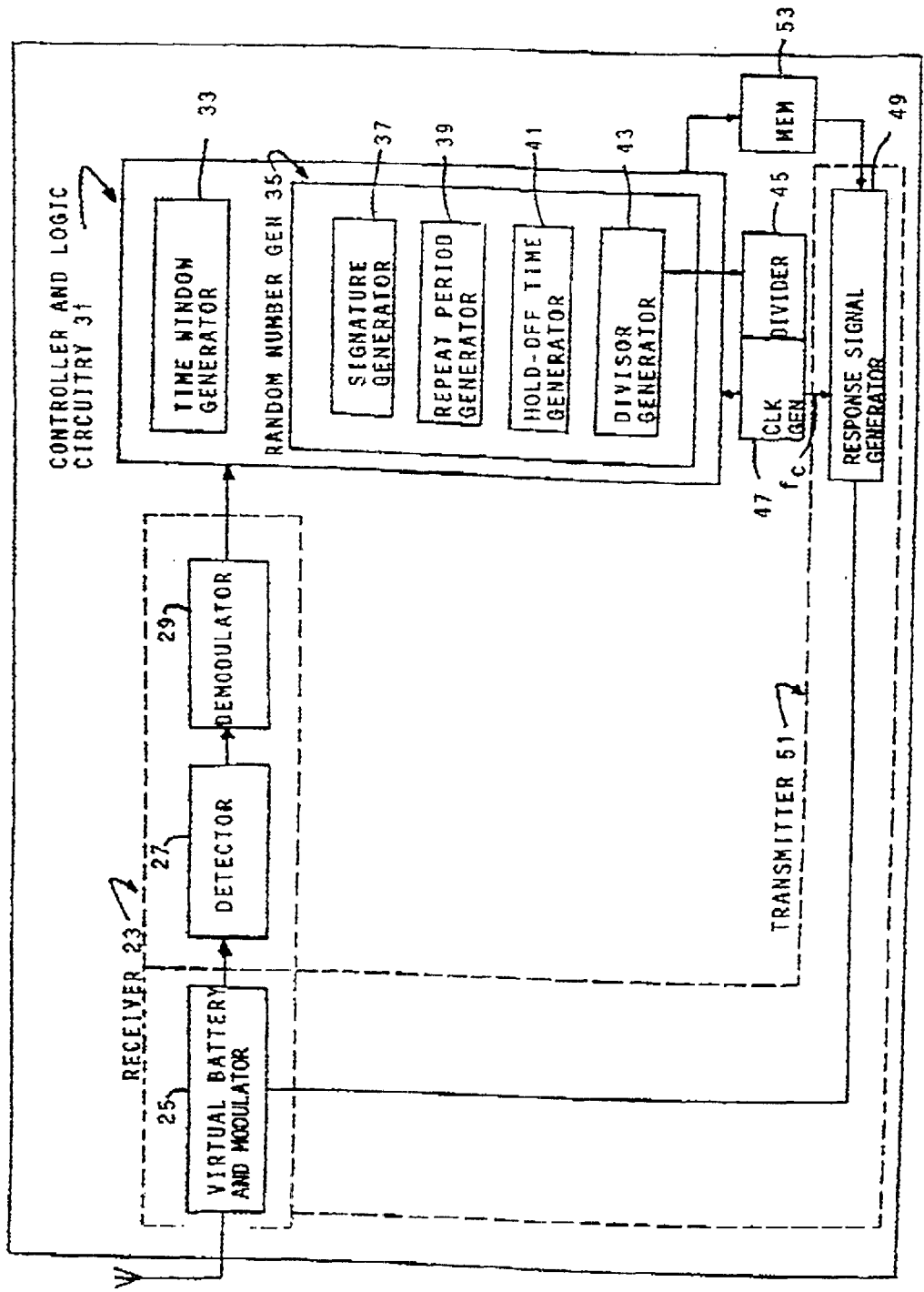

The invention will now further be described, by way of example only, with reference to the accompanying diagrams wherein FIG. 1 is a functional block diagram of an electronic identification system according to the invention comprising an interrogator and a plurality of transponders;

FIG. 2 is a more detailed block diagram of one of the transponders forming part of the system; and FIG. 3 is a diagrammatic representation against time of responses from transponders to an interrogation signal and acknowledgement thereof by the interrogator.

DESCRIPTION OF A PREFERRED EMBODIMENT OF THE INVENTION

In FIG. 1 there is shown an electronic identification system 100 copy an interrogator 10 and a plurality of transponders, transponder #1, transponder #2 and transponder #3 designated 12, 14 and 16 respectively which are mounted on or associated with articles (not shown) to be identified or counted.

The interrogator 10 comprises a transmitter for transmitting an interrogation or energizing signal to the transponders and a receiver 13 for receiving response signals from the transponders. A duplex arrangement 15 connects either the transmitter 11 or receiver 13 to antenna 17. The interrogator further comprises a controller 19 and an acknowledgement signal generator 21, the function of which will be described hereinafter.

The transponders 14, 16 and 18 are similar in configuration and therefore only transponder 14 will be described in more detail hereinafter, with reference to FIG. 2. Each transponder includes a receiver 23 including virtual battery 25, detector 27 and demodulator 29. The virtual battery captures and stores energy from the energizing signal, to power other circuitry of the transponder. In other embodiments other receivers such as super-regenerative, superheterodyne and homodyne receivers may be utilized.

The aforementioned other circuitry includes a controller 31 including a time window generator 33 which will be referred to hereinafter and a random number generator 35 which will also be referred to hereinafter. The random number generator 35 forms part of, or serves or functions as a signature generator 37 for generating a unique signature for the transponder, a repeat period generator 39 for generating a random repeat period (RP) between subsequent repetitions of response signals, a hold-off time-generator 41 for generating a random hold-off time after first reception of the interrogation signal and first transmission of the response signal and a divisor generator 43 for intermittently generating a random divisor for a divider 45 of a clock frequency ($f_c$) generator 47 forming part of the transponder. The transponder further includes a response signal generator 49 for generating a response signal to the interrogation signal and a memory arrangement 53 for storing data. The response signal generator forms part of a transmitter 51 for backscatter modulating the interrogation signal via modulator 25, to transmit the response signals to the interrogator. In other embodiments the transponder may comprise a local carrier generator (not shown) for generating and transmitting the response signal.

The energizing signal is shown at A in FIG. 2 and consequent responses from transponders #1 to #3, are shown at B to D respectively. As shown at B to D, upon reception of the energizing signal, each transponder reflects back to the interrogator intermittent signals 18 comprising some of the energy in the energizing signal by what is known as backscatter modulation and which energy is modulated with data shown in more detail in FIG. 3. The balance of the energy is utilized by virtual battery 25 to power the transponder circuitry, to enable it to perform its functions as herein described.

The response from each transponder comprises intermittently repeated response signals 18, each signal comprising start bits 20, synchronization bits 22, data bits 24, a signature or ID code 26, a CRC error correction code 28 and stop bits 30. The repetition period RP2 or RP3 of the signals 18 in the response of each transponder is randomly generated by Motor 39 and is not constant for a transponder. Furthermore, each transponder has a respective randomly generated hold-off time ($HOLD-OFF_1$ to $HOLD-OFF_3$) generated by generator 41 after energization commenced at 32 and before the transponder commences with the response. Immediately following each response signal 18, there is a time window 34 generated by generator 33 during which the respective transponder awaits and is responsive to an acknowledgement signal from the interrogator modulated on the energizing signal in A, that the response signal has been received and read by the interrogator. If the acknowledgement signal is received by the transponder within the time window 34 (see $TW_1$ in B for transponder #1), the transponder is switched to a mode wherein it does not further respond to the interrogation signal.

However, if an acknowledgement signal is not received within the time window 34 associated with that transponder (see $TW_2$ and $TW_3$ for transponders #2 and #3), the transponder, after the aforementioned randomly generated periods $RP_2$ in the case of transponder #2 and $RP_3$ in the case of transponder #3, repeats the response signal as shown at 18.1 in C and D, until it is received as hereinbefore described.

In the system according to the invention, and upon reception of the energization signal, each transponder, after its hold-off time, transmits the response signal 18. The interrogator 10 locks onto the strongest signal received from the plurality of transponders and utilizes the synchronisation bits 22, to sychronize a dock (not shown) of the interrogator with the clock 47 of the relevant transponder. The data 24 is received and stored. The interrogator also receives the signature or ID code 26 associated with that transponder.

During the time window 34 immediately following the response signal 18 received, the interrogator broadcasts the acknowledgement signal generated by acknowledgement signal generator 21 by modulating the energizing signal A with the ID code 26 just received as shown at 36 in A.

The transponder associated with that ID code then receives and interprets the acknowledgement and accepts that it has been read by the interrogator and it then switches to a mode wherein it no longer responds to the interrogation signal as shown at B. Since each transponder has a unique ID code, only the transponder actually read will be switched off.

As stated hereinbefore, respective hold-off times (HOLD-OFF$_1$ to HOLD-OFF$_3$) for transponders #1 to #3 are randomly generated by respective random number generators 35, 44 forming part of each transponder. Furthermore, the random number generator 35, 39 also determines the signal repetition period for each transponder, so that the signal reception period for a particular transponder (RP$_2$ in the case of transponder #2 and RP$_3$ in the case of transponder #3) is not constant, but varies randomly. Still furthermore, the random number generator 35, 37 also generates the signature or ID coded 26 for the transponder. The signature remains constant while the transponder remains energized but upon re-energization after an interruption in the energization, the generator generates another random signature.

To facilitate the interrogator locking onto a particular transponder and to alleviate interference between concurrent responses from transponders, the clock speeds of respective transponders may be varied by varying a divisor for a divider 45 in a respective programmable signal generator forming part of the respective transponders. The divisor may also be determined by the aforementioned respective random number generator 35,43.

Together with the acknowledgement 36 sent by the interrogator 10, the interrogator may also transmit a command or signal to cause the transponder just read, to change from its normal operational mode to a selected one of a plurality of other modes, such as a sleep mode for a predetermined short period of time; a sleep mode for a longer period of time; and a mode wherein it no longer responds to the energizing signal, but is able to be switched to the normal operational mode again at any time.

Although this description is focused on so-called passive transponders (i.e. transponders with a virtual battery which derives its power from the energizing signal), the claims also include within their scope so-called active transponders which have on-board power supplies.

It will be appreciated that there are many other variations in detail on the system and method according to the invention without departing from the scope and spirit of the appended claims.

What is claimed is:

1. An electronic identification system comprising an interrogator and a plurality of transponders the interrogator comprising:
    transmitter means for transmitting an interrogation signal to the transponders;
    each transponder comprising:
        signature generating means for generating a unique signature that is a characteristic of the respective transponder,
        transmitter means for transmitting in response to the interrogation signal, intermittent response signals comprising the signature;
        the interrogator further comprising acknowledgement signal generating means for generating upon reception of a response signal from one of the transponders, an acknowledgement signal comprising the unique signature of the one transponder to be transmitted by the transmitter means of the interrogator, thereby to acknowledge reception of the response signal to said one transponder.

2. A system as claimed in claim 1 wherein the transmitter means of the transponder comprises modulator means for backscatter modulating the interrogation signal with the response signal.

3. A system as claimed in claim 1 wherein each transponder comprises time window generating means for generating a time window immediately after transmission of each of the intermittent response signals; and a controller for causing the transponder to change from a normal operational mode to another mode, if an acknowledgement signal comprising the signature of the respective transponder is received during said time window.

4. A system as claimed in claim 3 wherein the signature generating means comprises a random number generator.

5. A system as claimed in claim 4 wherein the random generator includes means for determining a random delay or hold off period after first reception of the interrogation signal and before a first of said intermittent response signals is transmitted.

6. A system as claimed in claim 4 wherein the random number generator includes means for determining random repetition periods for the intermittent response signals.

7. A system as claimed in 4 wherein the random number generator includes means for generating a divisor for a programmable clock frequency divider of the transponder to yield a randomly selected clock frequency for the transponder.

8. A system as claimed in claim 1 wherein the acknowledgement signal also includes a command to cause the transponder to switch from a normal operational mode to a selected one of a plurality of other modes.

9. An interrogator for use with an electronic identification system also comprising a plurality of transponders, the interrogator comprising:
    transmitter means for transmitting an interrogation signal to the plurality of transponders;
    receiver means for receiving response signals originating from the plurality of transponders, each response signal comprising a signature that is a characteristic of a respective transponder from which the signature originates; and
    a controller for processing at least one of the response signals received and for causing an acknowledgement signal comprising the signature to be transmitted.

10. A transponder comprising:

receiver means for receiving an interrogation signal;

signature generating means for generating a signature characteristic of the transponder;

transmitter means for transmitting in response to the interrogation signal a response signal comprising the signature characteristic of the transponder; and a controller for causing the transponder to switch from one mode of operation to another, if an acknowledgement signal comprising the signature is received.

11. A transponder as claimed in claim 10 wherein the signature generating means comprises a random number generator and wherein the signature is in the form of a number.

12. A transponder as claimed in claim 11 wherein the number generator includes means for determining a random delay or hold off period after first reception of the interrogation signal and before the response signal is transmitted.

13. A transponder as claimed in claim 11 wherein the random number generator includes means for determining random repetition periods for the response signal.

14. A transponder as claimed in claim 11 wherein the random number generator includes means for determining a clock frequency for the transponder to yield a randomly selected clock frequency for transponder.

15. A transponder as claimed in claim 14 wherein the random number generator includes means for generating a divisor for a programmable clock frequency divider of the transponder.

16. A transponder as claimed in claim 10 wherein the transponder comprises time window generating means for generating a time window immediately after transmission of the response signal, within which time window the transponder can receive the acknowledgement signal.

17. A method of operating an electronic identification system comprising an interrogator and a plurality of transponders, the method comprising the steps of:

transmitting from the interrogator an interrogating signal to the transponders;

causing the transponders to receive the interrogation signal and each intermittently to respond with a response signal comprising a signature characteristic of the respective transponder, causing the interrogator to receive the response signals and to process a response signal from at least one of the transponders;

causing the interrogator to transmit an acknowledgement signal comprising the signature of the at least one of the transponders; and causing the at least one of the transponders upon reception of the acknowledgement signal to switch from one mode of operation to another mode of operation.

* * * * *